Feb. 8, 1944.   O. PHIPPS   2,341,237
MINING DRILL
Filed July 28, 1943
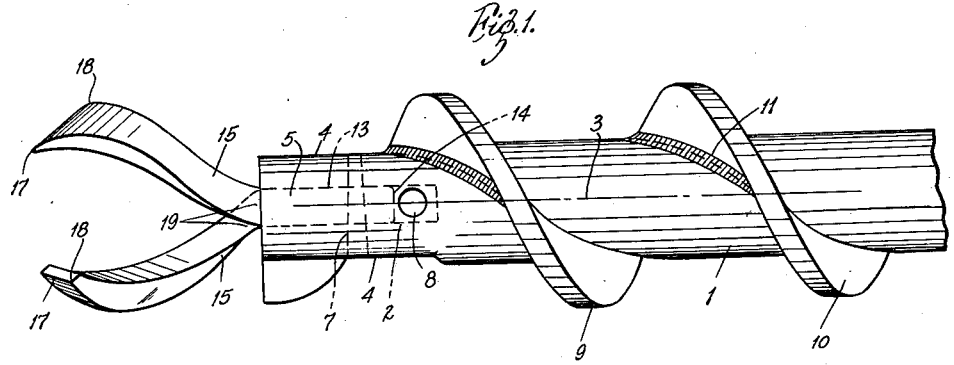
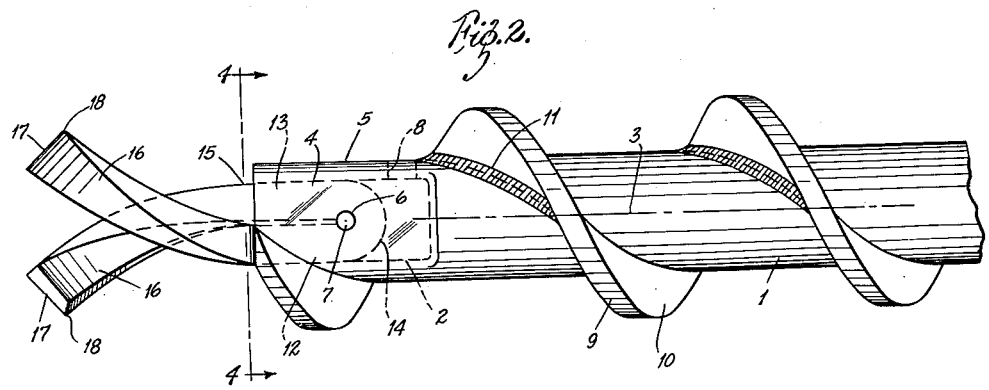
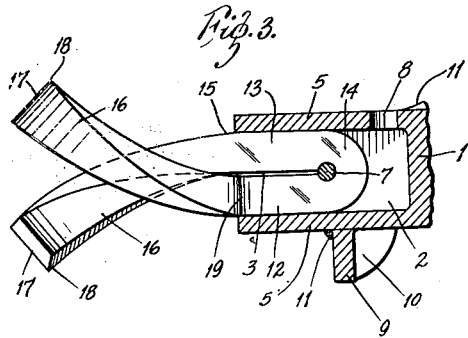 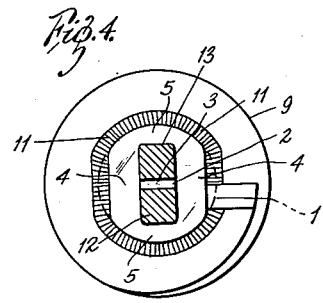
INVENTOR:
ORVILLE PHIPPS,
By John D. Rippey,
HIS ATTORNEY.

Patented Feb. 8, 1944

2,341,237

UNITED STATES PATENT OFFICE 2,341,237

MINING DRILL

Orville Phipps, Denver, Colo., assignor to Central Mine Equipment Co., St. Louis, Mo., a corporation of Missouri Application July 28, 1943, Serial No. 496,514

4 Claims. (Cl. 255—69)

This invention relates to mining drills; and it has special reference to rotary drills of the auger type for operating in minerals.

Objects of the invention are to provide an improved rotary mining drill of the auger type formed with a socket at one end of the spindle of the auger for receiving and holding a detachable bit and having a maximum diameter about the same as, and a smaller minimum diameter than, the diameter of said spindle of the auger, so that the chips or particles that are cut or formed by the bit will be forcibly fed without obstruction along and around said socket and thence along and around the spindle of the auger; to provide a spiral rib or thread attached to the periphery of the spindle of the auger and curving to the end and approximately midway of the maximum width of the socket in order to receive and forcibly feed along and around the socket and thence along and around the spindle of the auger chips or particles formed or produced by the rotary operation of the bit into and through the minerals; and to provide a biramous bit having a connecting and attaching portion detachably engageable in said socket and including two laterally diverging and forwardly curving arms for cutting into the mineral being drilled to form chips or particles to be fed along and around said socket and said spindle of the drill and having the front side of one of said arms for a distance beyond the end of said socket approximately in the same plane with the end of said rib or thread and functioning to feed and force portions of the chips or particles across the end and onto the feed wall of said rib or thread.

Another object of the invention is to provide an improved rotary drill of the auger type formed at one end with an attaching socket for receiving and holding an end portion of a detachable biramous bit, and a spiral rib or thread attached to the spindle of the auger and also to the outer surface of said socket in a novel cooperative relationship with respect to the bit, whereby the bit forcibly feeds the chips or particles formed or produced by operation of the drill across the end and onto the radial feed wall of said rib or thread.

Another object of the invention is to provide an improved rotary mining drill of the auger type formed with a socket at one end of the spindle for receiving an end portion of a detachable biramous bit, and a spiral rib or thread curving symmetrically along and around said spindle and said socket and means extending along the front wall of said rib or thread rigidly attaching the same to the spindle of the auger and to said socket, leaving the rear or feeding wall of said rib or thread uninterrupted by any attaching means and substantially smooth and at right angles to the periphery and axis of the spindle of the auger.

Other objects of the invention will appear from the following description, reference being made to the annexed drawing, in which—

Fig. 1 is a side elevation of a portion of the spindle of a rotary drill showing the socket, the spiral rib or thread attached to the spindle of the socket, and the biramous bit detachably engaged in the socket.

Fig. 2 is a side elevation of the same portion of the mining drill turned to a position about 90° from the position shown in Fig. 1.

Fig. 3 is a sectional view of the drill socket having the detachable biramous bit mounted therein.

Fig. 4 is a view showing the drill socket in end elevation, and the bit in section along the line 4—4 of Fig. 2.

The metallic spindle section 1 may be cylindrically tubular or solid as desired, or as required by the minerals into which the drill is intended to operate, and other conditions. Often two or more of these spindle sections are attached together in axial alinement to provide auger drills of different required or selected lengths. The outer or front end of the spindle section 1 is formed with a socket that is oblong in cross-section for receiving and holding a detachable bit to cut into the mineral in which the drill is operated and form chips or particles to be fed along and around said spindle and discharged from the hole formed by the drill.

According to the present invention, the said oblong socket that receives and holds the detachable bit has a maximum outside diameter about the same as the outside diameter of the spindle of the auger, and has a minimum diameter at right angles to the maximum diameter less than the outside diameter of said spindle. As shown, the socket 2 is oblong in cross-section and extends into the end of the section 1, has the same axis 3 as the section 1, and has a width in one direction approximately twice its width in the opposite direction, or at right angles to the direction of the greater width. Thus, the two approximately flat and parallel walls 4 which are integral with the section 1 form the wider sides of the socket 2, and the walls 5 which are integral with the walls 4 and the section 1 form the narrower sides of said socket. The inner surfaces of the walls 4 are preferably parallel throughout their length and width, and the inner surfaces of the walls 5 likewise are preferably parallel throughout their length and width. The walls 4 have flat outer surfaces which are equidistant from the axis 3 of the socket 2 and intersect the peripheral surfaces of the walls 5 as chords. Holes 6 are formed diametrically through the walls 4 in order to receive a pin 7 for holding the bit in the socket and preventing loss by accidental detachment of the bit. A hole 8 is formed through one of the walls 5 near or beyond the inner end of the bit for receiving the end of a lever extended into the socket to force or pry the bit from the socket after the bit holding pin 7 has been removed.

A metallic bar or strip of approximately uniform thickness and of uniform width is coiled spirally around the spindle section 1, or the spindle section 1 may be extended axially through the preformed spiral coils of said bar or strip. The spirally coiled bar or strip through which the spindle 1 extends forms a spiral rib or thread 9 which may be described as an acme thread and which has its rear side wall 10 extending at right angles to the periphery of the spindle 1 and radially of its axis. The rear side wall 10 of the rib or thread 9 constitutes the feed wall for forcibly feeding the chips or particles formed or produced by the drill along and around the spindle 1 to discharge said chips or particles from the hole being drilled. The opposite or front portion of the rib or thread 9 is integrally attached to the spindle 1 by attaching means consisting of a weld 11, thus leaving the rear side or feeding wall 10 of said rib or thread uninterrupted by any attaching means, substantially smooth throughout its length and width, and at right angles to the periphery and radially of the axis of the spindle. By this construction, binding and wedging of the chips and particles against the wall of the hole being drilled, as would occur if the rear side or feeding wall 10 inclined outwardly relative to the periphery and axis of the spindle 1, are avoided. The rib or thread 9 curves about, to the end, and terminates approximately midway of the maximum width of the socket 2— that is, about midway of the transverse width of one of the walls 4.

The bit which is attached in the oblong socket 2 and is specially designed for use in connection with and as a part of the drill, is made from a section of bit stock of proper length, which is square in cross-section, and of approximately uniform cross-sectional area throughout its length. The bar section of bit stock is bent about midway of its ends to form two arms composed of parallel portions 12 and 13, a curved connection 14 integrally uniting ends of said portions 12 and 13, oppositely bent portions 15 at the outer ends of said parallel portions 12 and 13, and outwardly and forwardly curved flattened or widened portions 16 terminating in cutting edges 17.

The outer ends or corners 18 of the long cutting edges 17 are spaced apart a distance considerably beyond the periphery of the rib or thread 9, in order to drill a hole of larger diameter than the diameter-over-all of the drill proper including the rib or thread 9. The cutting edges 17 are of considerably greater length than the thickness of the bit stock, that is, they have a length nearly double the thickness of said bit stock, and are formed by heating, and hammering or otherwise processing the curved portions 16 of the bit arms to provide this formation. This provides a symmetrical biramous bit in which the forward walls 19 of the two arms face each other at and for some distance beyond the open end of the socket 2. Irrespective of the relative positions in which the two parallel portions 12—13 and the curved interconnection 14 thereof are extended into the oblong socket 2, the forward wall 19 of the arm that is adjacent to the end of the rib or thread 9 is approximately in radial alinement with said end. Thus, during operation of the drill, the chips and particles are forced directly from the front side 19 of one bit arm across the end of and onto the rear side or feeding wall 10 of the rib or thread 9. The outwardly and oppositely curved portions 15 of the diverging bit arms constitute shoulders to engage against the ends of the socket walls 2 and function as stops to limit movement of the bit into the socket in a position in which the integral connection 14 is adjacent to the hole 8 for engagement by a lever pry to force the bit from the socket for any purpose desired. When the bit is in the socket, a retaining pin 7 extended through the holes 6 and through a complementary hole formed at the connection portion 14 holds the bit in the socket and prevents accidental displacement.

It has been found that a drill embodying these features and elements operates more easily and rapidly into and through hard minerals than other drills having heads or sockets of substantially greater diameter or thickness than the diameter or thickness of the drill spindle. It breaks the mineral into chips or particles more nearly the size of wheat or rice grains than of dust or comminuted size. It has also been found that, by extending the web or thread 9 to the end of the socket in an arrangement in which the end of the rib or thread is adjacent to the front side or wall of one of the cutting arms, the feed of the chips or particles onto and along the thread is considerably facilitated. The movement of the chips and particles by and along the rib or thread is further expedited and facilitated by the radial arrangement and smooth formation of the rear side or feeding wall 10 of the rib or thread.

I claim:

1. In a rotary mining drill of the auger type having an elongated rotary spindle, two parallel flat and two integral oppositely disposed connecting walls at one end of said spindle forming a socket that is oblong in cross-section and has an outside maximum diameter through said connecting walls about the same as the outside diameter of said spindle and an outside minimum diameter through said flat walls less than said outside diameter of said spindle, a spiral rib or thread encircling said spindle and extending continuously to the end of said socket and having its end approximately midway of one of said flat walls and having a smooth and uninterrupted rear side feeding wall extending at right angles from the periphery of said spindle, means attaching the opposite side of said rib or thread to said spindle, leaving said rear side feeding wall smooth and uninterrupted as aforesaid, and a bit extending into said socket.

2. In a rotary mining drill of the auger type having an elongated rotary spindle, two parallel flat walls and two oppositely disposed connecting walls at one end of said spindle forming a socket that is oblong in cross-section and has an outside maximum diameter through said connecting walls about the same as the outside diameter of said spindle and an outside minimum diameter through said flat walls less than the outside diameter of said spindle, a spiral rib or thread encircling said spindle and said socket and extending continuously to the end of said socket and having its end approximately midway of the width of one of said flat walls and also having a smooth and uninterrupted rear side feeding wall extending at right angles from the periphery of said spindle, a sharp edge at the end of said rib along said rear side feeding wall extending nearly radially of said socket, means attaching the opposite side of said rib or thread to said spindle, leaving said rear side feeding wall smooth and uninterrupted as aforesaid, and a unitary biramous bit extending into said socket and having the front side of one of its arms approximately in the same radial plane with said edge.

3. In a rotary mining drill of the auger type having an elongated rotary spindle, two parallel flat walls and two oppositely disposed connecting walls at one end of said spindle forming a socket that is oblong in cross-section and has an outside maximum diameter through said connecting walls about the same as the outside diameter of said spindle and an outside minimum diameter through said flat walls less than the outside diameter of said spindle, a spiral rib or thread integral with and encircling said spindle and said socket and extending continuously to the end of said socket and terminating approximately midway of the width of one of said flat walls and having a rear side feeding wall extending at right angles to the periphery of said spindle, a biramous bit having its two arms extending into said socket, a connection integrally uniting said arms within said socket, diverging portions on said arms forming shoulders to engage against the end of said flat walls of said socket and limit movement of said arms into said socket and having their adjacent walls approximately alined with the end of said rib or thread, and means detachably holding said bit in said socket.

4. In a rotary mining drill of the auger type having an elongated rotary spindle, two parallel flat walls and two oppositely disposed connecting walls at one end of said spindle forming a socket that is oblong in cross-section and has an outside maximum diameter through said connecting walls about the same as the outside diameter of said spindle and an outside minimum diameter through said flat walls less than the outside diameter of said spindle, a spiral rib or thread encircling said spindle and said socket and terminating at the outer end of one of said flat walls of said socket, a biramous bit having portions of its two arms of approximately equal and uniform dimensions and extending side by side into said socket, an integral connection uniting the ends of said two arms that are within said socket, diverging and twisted portions of said two arms outwardly from said socket forming shoulders engaging against the ends of said flat walls and limiting movement of said two arms and said connection into said socket and having their adjacent walls approximately alined with the end of said rib or thread, and forwardly extended cutting edges at the forward ends of said arms.

ORVILLE PHIPPS.